May 7, 1963 J. W. FOLTZ 3,088,763
QUICK DISCONNECT COUPLING
Filed Sept. 16, 1960 2 Sheets-Sheet 1
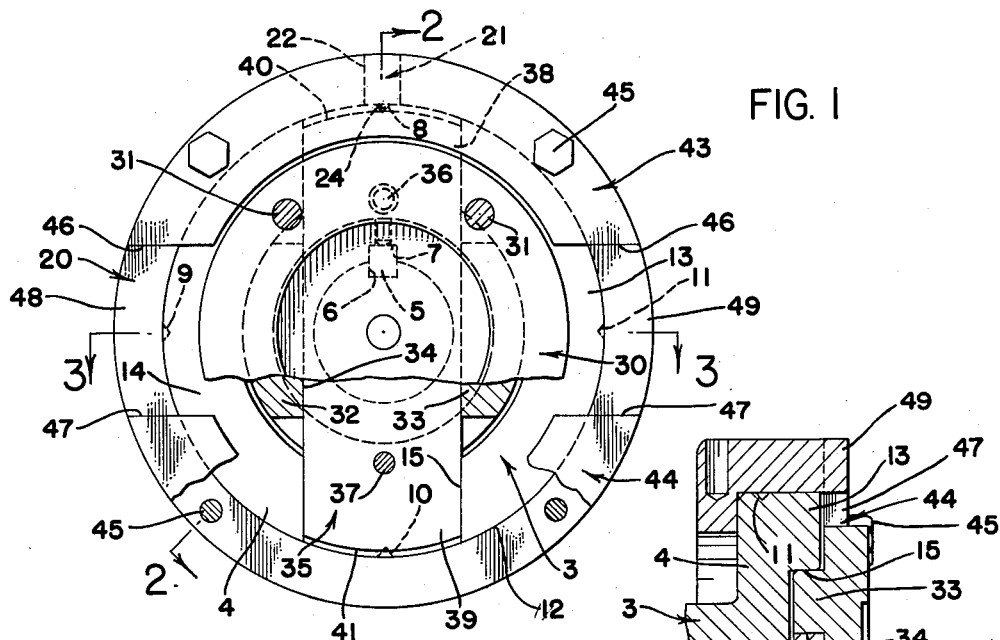
FIG. 1
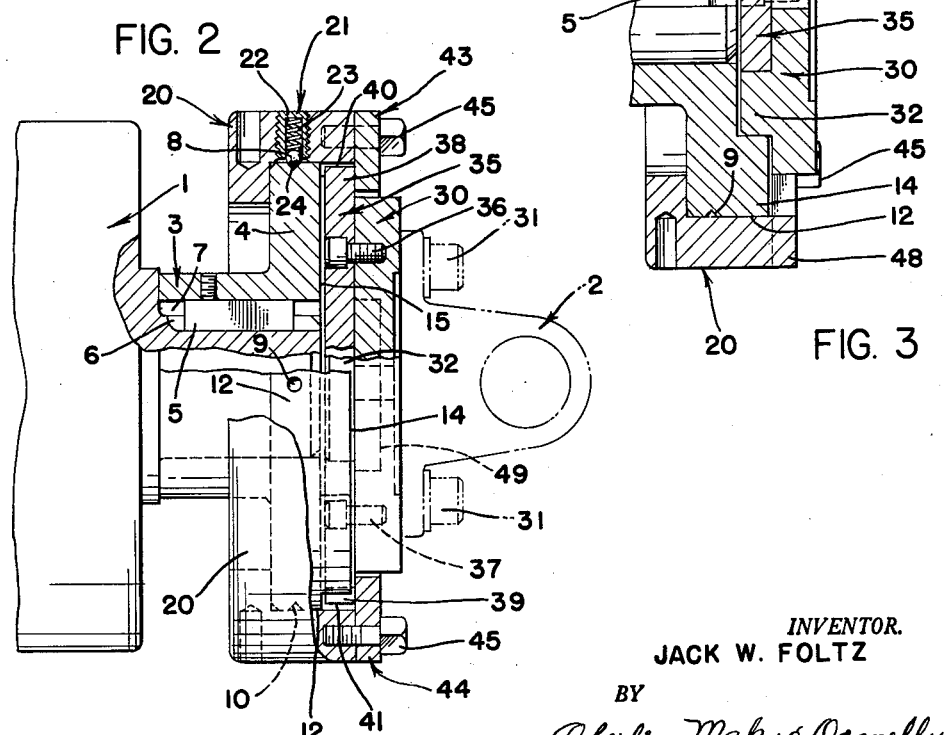
FIG. 2
FIG. 3
INVENTOR.
JACK W. FOLTZ
BY
Oberlin, Maky & Donnelly
ATTORNEYS

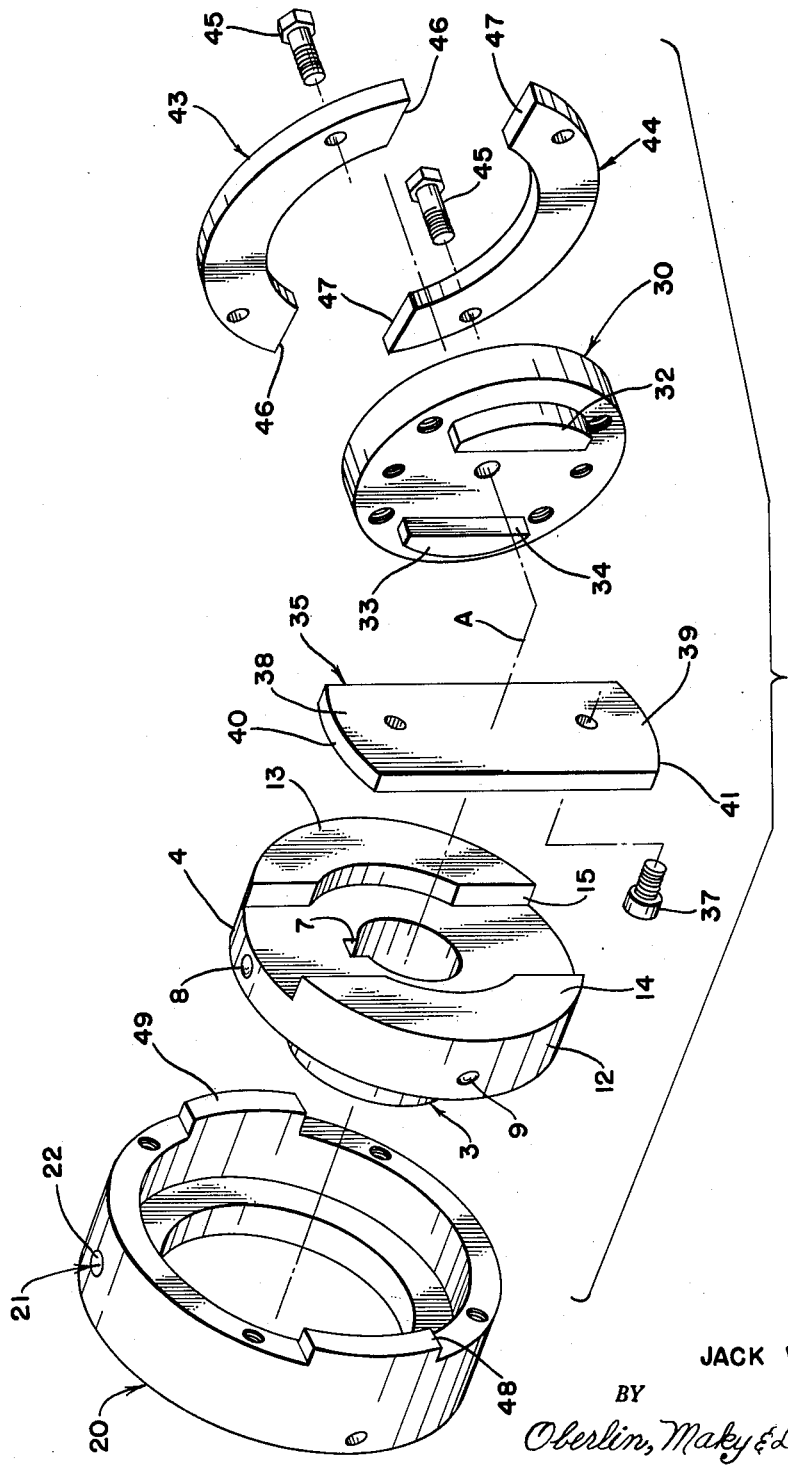

United States Patent Office 3,088,763
Patented May 7, 1963

3,088,763
QUICK DISCONNECT COUPLING
Jack W. Foltz, North Olmsted, Ohio, assignor to The Yoder Company, Cleveland, Ohio, a corporation of Ohio
Filed Sept. 16, 1960, Ser. No. 56,508
8 Claims. (Cl. 287—129)

This invention relates, as indicated, to a quick disconnect coupling and more particularly to a torque transmitting shaft coupling for heavy duty mill drives which can easily be connected and disconnected.

In conventional heavy duty drives for mill rolls such as forming or straightening rolls, to disconnect the coupling assembly it is generally necessary to brace a universal propeller shaft while removing a minimum of two cap screws. When the screws are removed, an adaptor flange must then be slid off a key. On a smaller mill, this is a one man job which takes approximately two minutes per connection but on larger mills this is at least a two man job. Reconnecting the coupling requires at least two men and much more time to align the adaptor flange to the key and start the screws while properly supporting the drive shaft. On forming mills, the removal of the connecting assembly requires removing at least four bolts per pass to disconnect the pass from the drive.

It is accordingly a principal object of this invention to provide a simpler and quicker means of disconnecting and connecting drive and driven shafts on various types of mills.

It is another object of this invention to provide a quick disconnect assembly which requires only a 90° rotation of a holding ring for locking the connected shafts or disconnecting such shafts.

It is yet another object of this invention to provide a quick disconnect coupling having a locking ring through which no torque is required to be transmitted.

A further object of this invention is to provide an easily connected and disconnected torque transmitting coupling which can readily be made from a few relatively simple parts.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail an illustrative embodiment of the invention, this being indicative, however, of but one of the various ways in which the principles of the invention may be employed.

In said annexed drawings:

FIG. 1 is an end elevation of a quick disconnect assembly in accordance with the present invention with parts broken away better to disclose the same;

FIG. 2 is a fragmentary sectional view taken substantially on the line 2—2 of FIG. 1;

FIG. 3 is a fragmentary sectional view of the assembly of FIG. 1 taken substantially on the line 3—3 thereof; and FIG. 4 is an exploded view illustrating the assembly relationship of the illustrated disconnect coupling on a bent axis better to show several parts thereof.

Referring first to the quick disconnect assembly as shown in its assembled condition in FIGS. 1 through 3 inclusive, and more especially to FIG. 2, it will be seen that such assembly provides a torque connection between a roll shaft 1 and the yoke 2 of a universal propeller shaft which is indicated in phantom lines. Keyed to the roll shaft 1 is a shaft flange member 3 having an outwardly directed flange portion 4. The shaft flange member 3 may be secured to the roll shaft by key 5 fitting within key slots 6 and 7 on the roll shaft 1 and shaft flange member 3 respectively. The flange portion 4 of the member 3 is provided with four quadrant spaced cone-point indentations 8, 9, 10 and 11 in the outer right circular cylindrical surface 12 thereof and the outer face of the flange portion 4 is provided with two circular ring segment bosses 13 and 14 which are on diametrically opposite sides and form the slot 15 between the opposed parallel ends thereof.

A locking ring 20 is mounted on the flange portion 4 of the flange member 3 and has an inside diameter such that it will slide freely around the outer surface 12 of the flange 4. A ball plunger 21 is mounted in the locking ring 20 and such ball plunger includes a plastic or like externally threaded housing 22 secured in a threaded opening in the locking ring. A spring 23 forcing ball 24 against the surface 12 of the flange portion 4 of the flange member 3 is secured in such housing. The locking ring 20 may accordingly be rotated about the flange portion 4, with the ball 24 engaging the respective cone-point indentations 8 through 11 providing a detent selectively to hold the locking ring with the ball engaged in any one of the quadrant spaced indentations. Simple hand pressure is all that is required to rotate the locking ring 20 to disengage the ball 24 from any of the cone-point indentations. The ball plunger will, however, engage the cone-point indentations and hold the locking ring at that selected point without further external force.

An adaptor 30 is secured to the yoke 2 of the universal drive shaft by means of four cap screws or bolts 31. The inner face of the adaptor is provided with two arcuate diametrically opposed segmental bosses 32 and 33, with the inner parallel edges of the bosses 32 and 33 forming a slot 34 of the same width as slot 15 between the bosses 13 and 14 on the face of the flange member 3. The bosses 32 and 33 fit within the arcuate inner portions of the bosses 13 and 14 to permit rotation of the adaptor with respect to the flange member 3. A tongue 35 is fastened to the adaptor between the bosses 32 and 33 as by bolts 36 and 37, such tongue closely fitting within the slot 15 formed between the bosses 13 and 14 of the flange member 3 as well as the slot 34 between the bosses 32 and 33 of the adaptor 30. The tongue extends diametrically beyond the adaptor as shown at 38 and 39 in FIG. 2 and is of only slightly less diameter than the flange portion 4 of the flange member 3. The ends of the tongue as shown at 40 and 41 are rounded with the center of the assembly as the center of such curved end portions. Thus the tongue 35, adaptor 30, and yoke 2 of the universal propeller shaft comprise a rigid unitary construction and form the drive portion of the present quick disconnect assembly.

Secured to the face of the locking ring 20 are two ring segment plates 43 and 44 which overlap the tongue and hold the tongue in the shaft flange groove 15 when the locking ring is indexed to the position shown in FIG. 1. The plates 43 and 44 may be fastened directly to the face of the locking ring by spaced bolts 45. The plates 43 and 44 are diametrically spaced and provided with opposed chordal end faces 46 and 47 which are spaced apart a distance substantially equal to the width of the tongue 35 and the slot 15. Thus, when the locking ring 20 is indexed through 90° from the position shown in FIG. 1 so that the ball 24 will engage either the cone-point indentation 9 or the cone-point indentation 11, the plates 43 and 44 will then not cover the tongue, and the tongue, adaptor and yoke of the propeller shaft may then be axially withdrawn to disconnect them from the driven portion of the mechanism. In order to guarantee the proper placement of the circular plates 43 and 44, the face of the locking ring 20 may be provided with diametrically opposed bosses 48 and 49 against which the opposed faces 46 and 47 of the ends of the circular plates 43 and 44 abut.

It can now be seen that the roll 1, the shaft flange member 3 and the locking ring 20 together with the circular plates 43 and 44 form the driven sub-assembly of the shaft coupling. Since approximately ¾ of an inch collapse is permitted in the universal propeller shaft, the yoke 2 may readily be moved to the right as seen in FIG. 2 so as to disconnect the drive sub-assembly from the driven sub-assembly.

Referring now to FIG. 4, it will be seen that there are only four basic components of the coupling excluding the circular plates 43 and 44. Thus, the locking ring 20, the shaft flange member 3, tongue 35, and adaptor 30 form the basic components of the present invention. The circular plates 43 and 44 cooperate with the locking ring 20 to form the holding ring for the tongue 35 in the slot 15 which may be selectively moved to a release position whereby the tongue may be withdrawn. The parts can easily be assembled along the axis A about which the ring 20 is rotated.

Whereas the illustrated embodiment of the present invention shows only one ball plunger employed in the locking ring, it will be appreciated that as many as four may be employed properly to hold the locking ring in the selected position. Also, other well-known types of detents may be used.

Since no torque is transmitted through the locking ring 20, it can readily be seen that there is no danger of such locking ring inadvertently releasing the drive sub-assembly of the mechanism during operation of the mill. With a few easily manufactured parts there is provided a torque transmitting coupling which may easily be connected and disconnected saving many man hours of time in the erection, operation and maintenance of heavy duty mills.

Other modes of applying the principles of the invention may be employed, change being made as regards the details described, provided the features stated in any of the following claims or the equivalent of such be employed.

I, therefore, particularly point out and distinctly claim as my invention:

1. A quick disconnect torque transmitting coupling comprising a drive sub-assembly and a driven sub-assembly, one said sub-assembly comprising an adaptor having a diametrically extending tongue secured thereto, the other said sub-assembly comprising a flange member, said flange member having an outwardly extending circular flange portion, said flange portion having a diametrically extending slot in the face thereof and a right circular cylindrical outer surface, said tongue closely fitting within said slot; a locking ring mounted on said flange portion, said locking ring being provided on the face thereof with two circular diametrically opposed plates adapted to overlie said tongue holding the same within said slot in one selected position of rotation of said locking ring and to release said tongue from said slot in another selected position of rotation thereof, and means on said locking ring and flange portion cooperating selectively to hold said locking ring in the selected position of rotation.

2. The shaft coupling set forth in claim 1 wherein said means comprises a spring-pressed ball secured in said locking ring mutually cooperating with quadrant spaced cone indentations in said flange portion of said flange member.

3. The shaft coupling set forth in claim 2 wherein said circular plates secured to said locking ring provide a circular opening therethrough to accommodate said adaptor.

4. The shaft coupling set forth in claim 3 wherein said slot in the face of the flange portion of said flange member is formed by two circular diametrically opposed bosses having inner arcuate edges accommodating therebetween circular opposed bosses on said adaptor holding said tongue therebetween.

5. A torque transmitting coupling assembly comprising a drive sub-assembly including two arcuate diametrically opposed segmental bosses and a diametrically extending tongue secured therebetween and projecting radially therebeyond, a driven sub-assembly having axially extending diametrically opposed ring segment bosses forming a diametrically extending slot adapted to receive the projecting ends of said tongue, said arcuate segmental bosses fitting within the arcuate inner portions of said ring segment bosses, and a rotatable locking ring axially fixed on said driven sub-assembly selectively rotatable to overlie the projecting ends of said tongue to hold said tongue within said slot or permit release of said tongue therefrom.

6. The torque coupling set forth in claim 5 wherein said driven sub-assembly comprises a shaft flange member keyed to a roll shaft and the like, said shaft flange member including an outwardly extending flange portion having an outer right circular cylindrical surface with four quadrant spaced cone-point indentations therein, said indentations cooperating with a ball plunger in said locking ring selectively to position said locking ring about said outer surface of said flange portion of said flange member.

7. The shaft coupling set forth in claim 5 wherein said locking ring includes diametrically opposed spaced circular plates adapted to overlie and hold said tongue in said groove upon such selective rotation of said locking ring.

8. The torque coupling set forth in claim 5 wherein said drive sub-assembly includes a yoke for a universal propeller shaft with the tongue being connected thereto through an adaptor.

References Cited in the file of this patent
UNITED STATES PATENTS
1,070,233    Curtis _____ Aug. 12, 1913